United States Patent
Ra et al.

(10) Patent No.: US 6,377,623 B1
(45) Date of Patent: Apr. 23, 2002

(54) HIGH SPEED MOTION ESTIMATING METHOD FOR REAL TIME MOVING IMAGE CODING AND APPARATUS THEREFOR

(75) Inventors: Jong-beom Ra, Taejun; Kyoung-won Lim, Seoul; Geon-young Choi, Suwon, all of (KR)

(73) Assignees: Samsung Electronics Co., Ltd., Kyungki-do; Korean Advanced Institute of Science and Technology, Taejun, both of (KR)

(*) Notice: Subject to any disclaimer, the term of this patent is extended or adjusted under 35 U.S.C. 154(b) by 0 days.

(21) Appl. No.: 09/259,299

(22) Filed: Mar. 1, 1999

(30) Foreign Application Priority Data

Mar. 2, 1998 (KR) .............................. 98-6718

(51) Int. Cl.$^7$ ................................ H04N 7/18
(52) U.S. Cl. ................................ 375/240; 375/240.16
(58) Field of Search ................ 375/240.16, 240.17; 382/236

(56) References Cited

U.S. PATENT DOCUMENTS

| 5,477,272 A | | 12/1995 | Zhang et al. ............... 348/407 |
| 6,118,901 A | * | 9/2000 | Chen et al. ................. 382/236 |
| 6,154,491 A | * | 11/2000 | Uetani ........................ 375/240 |
| 6,229,570 B1 | * | 5/2001 | Bugwadia et al. .......... 348/441 |

FOREIGN PATENT DOCUMENTS

| JP | 4-266292 | 9/1992 |
| JP | 7-135663 | 5/1995 |
| JP | 7-154801 | 6/1995 |
| JP | 7-203462 | 8/1995 |
| JP | 7-222159 | 8/1995 |
| JP | 7-288814 | 10/1995 |
| JP | 8-265771 | 10/1996 |
| JP | 8-265773 | 10/1996 |

* cited by examiner

*Primary Examiner*—Andy Rao
(74) *Attorney, Agent, or Firm*—Sughrue Mion, PLLC

(57) ABSTRACT

A method for estimation of a motion image and an apparatus therefor are provided. The motion estimating method includes the steps of (a) providing layer 1 by reducing the resolution of layer 0 and providing layer 2 by reducing the resolution of layer 1, wherein the layer 0 is an input image frame, (b) calculating a mean absolute difference (MAD) with respect to a search region of the layer 2, (c) determining at least two positions in which the MAD calculated in the step (b) is minimized as initial search center points in the layer 1, (d) further determining at least one initial search center points in the layer 1 using a correlation of neighborhood blocks of a current block, (e) calculating a MAD with respect to search regions using the initial search center points as a center in the layer 1, (f) selecting a position in which the MAD calculated in the step (e) is minimized as the search center point in the layer 0, (g) calculating a MAD with respect to a search region using the initial search center points selected in the step (f) as a center in the layer 0, and (h) determining a final motion vector from information on the distance between the position in which the MAD calculated in the step (g) and the origin. It is possible to motion-estimate at a high speed by remarkably reducing the complexity with almost no reduction in the performance compared to that of a full scale block matching analysis (FSBMA).

56 Claims, 3 Drawing Sheets

GROUP 1

GROUP 2

GROUP 3

GROUP 5

GROUP 5

HIGH SPEED MOTION ESTIMATING METHOD FOR REAL TIME MOVING IMAGE CODING AND APPARATUS THEREFOR

BACKGROUND OF THE INVENTION

1. Field of the Invention

The present invention relates to a super high-speed motion estimating method for real time moving image coding. More particularly, the invention relates to a motion estimating method for reducing the complexity of calculating a motion vector by lowering the resolution for motion picture coding and determining a plurality of motion vector candidates under the lowered resolution. The motion vector candidates may be determined by using motion vector correlation of neighborhood blocks. After the candidates are determined, search areas are selected having a plurality of motion vector as centers, and a final motion vector is calculated based on the search areas. Also, an apparatus for performing the method is provided.

2. Description of the Related Art

Motion compensation coding for removing a temporal duplication of a moving image is used in order to obtain a high data compression rate. Such coding plays an important role in International Video Coding Standards such as the MPEG-1, 2, and 4 Standards or the H-263 Standard.

The motion compensation coding predicts an image that is the most similar to a received image based on information of a previous frame of the image. Specifically, motion compensation coding uses motion estimation and conversion codes and obtains a subtraction image by subtracting an estimated image from the received image. The subtraction image is processed and encoded so that it represents a compressed version of the moving image.

A general apparatus that employs moving image coding is shown in FIG. 1.

As shown in the figure, the apparatus includes a frame memory 102, motion estimators 104 and 106, a motion compensator 108, a subtracter 110, a discrete cosine transformer 112, a quantizer 114, an inverse quantizer 116, an inverse discrete cosine transformer 118, an adder 120, a frame delay 122, a forward analysis and coding rate controller 124, a variable length encoder 126, and a buffer 128.

A received image is input in units of a frame and is stored in the frame memory 102. Then, the image frame is output to the first motion estimator 104 is which calculates a first motion vector based on the image, and the motion vector has units of an integer number of pixels. The second motion estimator 106 calculates a second motion vector based using the first motion vector generated by the first motion estimator 104, the image frame received from the frame memory 102, and information of a previous frame of the image received from the frame delay 122. The second motion vector has units of a half-pixel.

The motion compensator 108 inputs the motion vector from the second motion estimator 106 and the information of the previous frame from the frame delay 122, performs a motion compensation operation based on such inputs, and outputs an estimated image frame with respect to a current frame of the image. The subtracter 110 inputs the current image frame from the frame memory 102 and the estimated image frame from the motion compensator 108 and subtracts the estimated image frame from the current image frame to produce a subtracted image frame. As a result, the subtracted image frame is frame in which the temporal duplication of the moving image is removed.

The above motion estimating and compensating processes are performed in units of a 16×16 block, and such a block is generally referred to as a macro block. After the subtraction image is generated, it output to the discrete cosine transformer 112 and subjected to a discrete cosine transformation. Then, the image is output to the quantizer 114 and quantized. As a result, any remaining spatial duplication of the subtraction image is removed. The motion vectors and the quantized subtraction image are encoded by the variable length encoder 126 and are transferred in a bit stream pattern through the buffer 128.

The quantized subtraction image is also interpolated and restored by the inverse quantizer 116 and the inverse discrete cosine transformer 118. The restored image is added to the estimated image generated by the motion compensator 108 via the adder 120 and the resultant signal is stored in the frame delay 122 and delayed by one frame. The image stored in the frame delay 122 corresponds to the previous image frame of an image that immediately precedes the current image frame output by the frame memory 102. The previous image frame stored in the frame delay 122 is output to the second motion estimator 106 and the motion compensator 108 as described above.

The forward analysis and coding rate controller 124 inputs the current image frame from the frame memory 102 and controls the coding rate of the variable length coder 126.

Currently, a method for estimating and compensating the motion of a moving image in units of a frame and a method for estimating and compensating the motion of a moving image in units of a field are known to those skilled in the art. Therefore, a description of such methods is omitted in the present specification for the sake of brevity.

One conventional method for estimating motion is called a full-scale block matching analysis ("FSBMA"). In such analysis, a two-dimensional motion vector of each block is estimated by dividing a current frame into blocks having a uniform size. Then, the respective blocks are compared with all the blocks in a search region of a reference frame according to a given matching standard, and the position of an optimal matching block is determined. A mean absolute difference ("MAD") is a relatively simple calculation and is used as a matching standard for determining the optimal matching block in such a conventional block matching method. The MAD is calculated using Equation 1.

$$MAD(i, j) = \frac{1}{N^2} \sum_{k=1}^{N} \sum_{l=1}^{N} |f_t(k, l) - f_{t-1}(k+i, l+j)| \qquad (1)$$

wherein, $f_t(k,l)$ is the brightness value of a pixel in a position (k, l) of the current frame, and $f_{t-1}(k+i,l+j)$ is the brightness value of a pixel in a position offset from the position (k, l) by a distance (i, j).

In such a block matching method, the maximum motion estimation scope is determined by considering the motion of real images when the coding is performed. The FSBMA estimates the motion vector by comparing all the blocks in the motion estimation scope with current blocks and has the highest performance considering an estimated gain. However, an excessive amount of calculation is required to perform the FSBMA. For example, when the maximum movement displacement in a frame is ±p (a pulse/a frame) with respect to a block having a size of M×N, the size of the search region is (M+2p)×(N+2p) in a reference frame. Since the number of candidate blocks to be compared with all of the blocks in the region is $(2p+1)^2$, it becomes more difficult to accurately perform real time moving image encoding as p becomes larger.

Another conventional method for solving such a problem is provided in "A Fast Hierarchical Motion Vector Estimation Algorithm Using Mean Pyramid", K. M. Nam, J. S. Kim, R. H. Park, Y. S. Shim, IEEE Trans. of Circuits & Systems for Video Technology, 1995, 5, (4), pp. 344–351 and "Accuracy Improvement And Cost Reduction of 3-step Search Region Matching Algorithm for Video Coding", IEEE Trans. Circuits & Systems for Video Technology, 1994, 4, (1), pp. 88–90. In the above documents, high-speed hierarchical search methods that use a plurality of candidates and that can replace the FSBMA are described.

Such methods of using a plurality of candidates can solve the problem of a local minimum value which occurs due to a hierarchical search. However, a large amount of calculation is still required in order to achieve a performance comparable to the performance of the FSBMA. Also, since the methods are based on a three-step hierarchical searching method, they are not suitable for estimating a motion in a wide search region.

SUMMARY OF THE INVENTION

To solve the above problems, it is an objective of the present invention to provide a motion estimating method which estimates a motion vector at a high speed by reducing the amount of calculation for calculating the motion vector.

It is another objective of the present invention to provide a motion estimating apparatus that performs the motion vector estimating method.

In order to achieve the above an other objectives, a motion estimating method is provided that uses block matching in order to compress a moving image. The method comprises the steps of: (a) inputting an input image frame as a layer 0 frame; (b) reducing a resolution of said layer 0 frame to produce a layer 1 frame; (c) reducing a resolution of said layer 1 frame to produce a layer 2 frame; (d) calculating a first mean absolute difference ("MAD") with respect to a layer 2 search region of said layer 2 frame; (e) evaluating said layer 2 search region to identify a first initial search center point based on said first MAD and determining a first layer 1 search region based on said first initial search center point; (f) calculating a second MAD with respect to said first layer 1 search region in said layer 1 frame by using said first initial search center point as a center in said first layer 1 search region; (g) evaluating said first layer 1 search region to identify a first layer 0 search center point based on said second MAD and determining a first layer 0 search region based on said first layer 0 search center point; (h) calculating a third MAD with respect to said first layer 0 search region in said layer 0 frame by using said first layer 0 search center point as a center in said first layer 0 search region; and (i) determining a final position in said first layer 0 search region based on said third MAD and determining a final motion vector based on information corresponding to a distance between said final position and an origin.

Also, an apparatus for performing the method and a computer readable medium containing a program for performing the method is also provided.

BRIEF DESCRIPTION OF THE DRAWING(S)

The above objectives and advantages of the present invention will become more apparent by describing in detail a preferred embodiment thereof with reference to the attached drawings in which.

Figure 3:
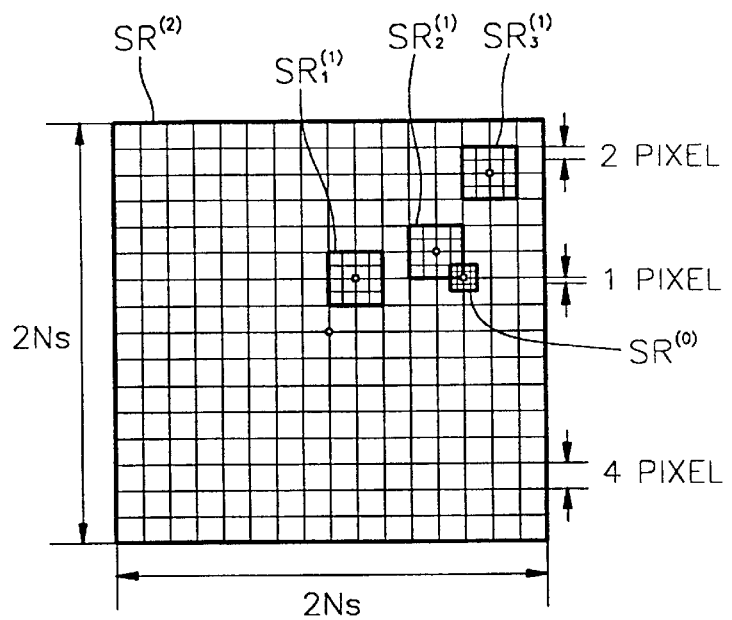

FIG. 3 describes hierarchical searching positions when a hierarchical search is performed by a motion estimating method according to the embodiment of the present invention; and FIG. 4 describes processes of determining motion vector candidates using the correlation of a current block with respect to peripheral blocks in the motion estimating method according to the embodiment of the present invention.

DESCRIPTION OF THE PREFERRED EMBODIMENTS

Hereinafter, preferred embodiments of a super high-speed motion estimating method for real time moving image coding and an apparatus therefor will be described in detail with reference to the attached drawings. Also, the following description of the preferred embodiments discloses specific methods and configurations. However, the preferred embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations of the present invention which would have been known to one skilled in the art are omitted for the sake of clarity and brevity.

Figure 1:
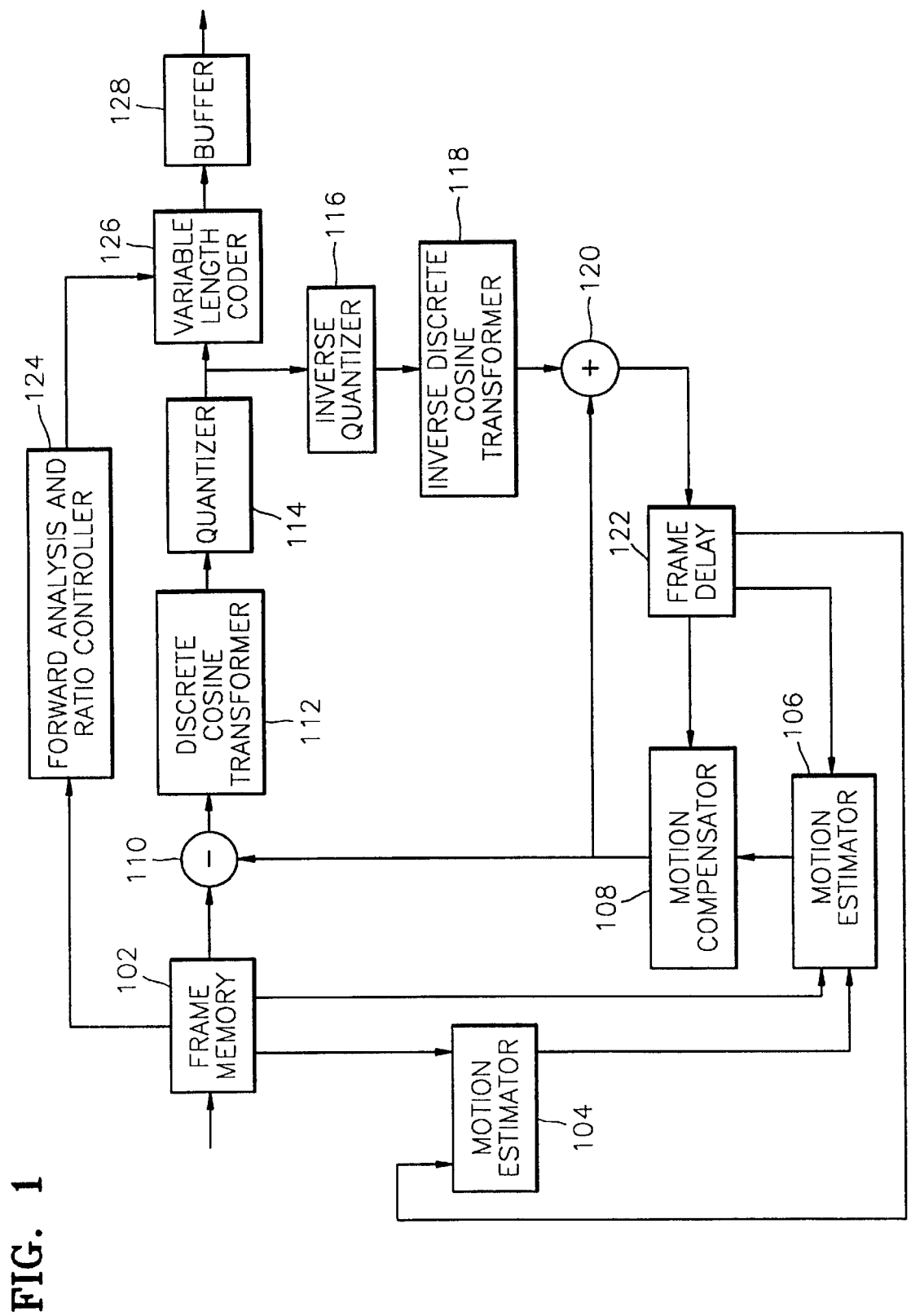
FIG. 1 is a block diagram showing the schematic structure of a moving image coding apparatus to which the present invention is applied.
Figure 2:
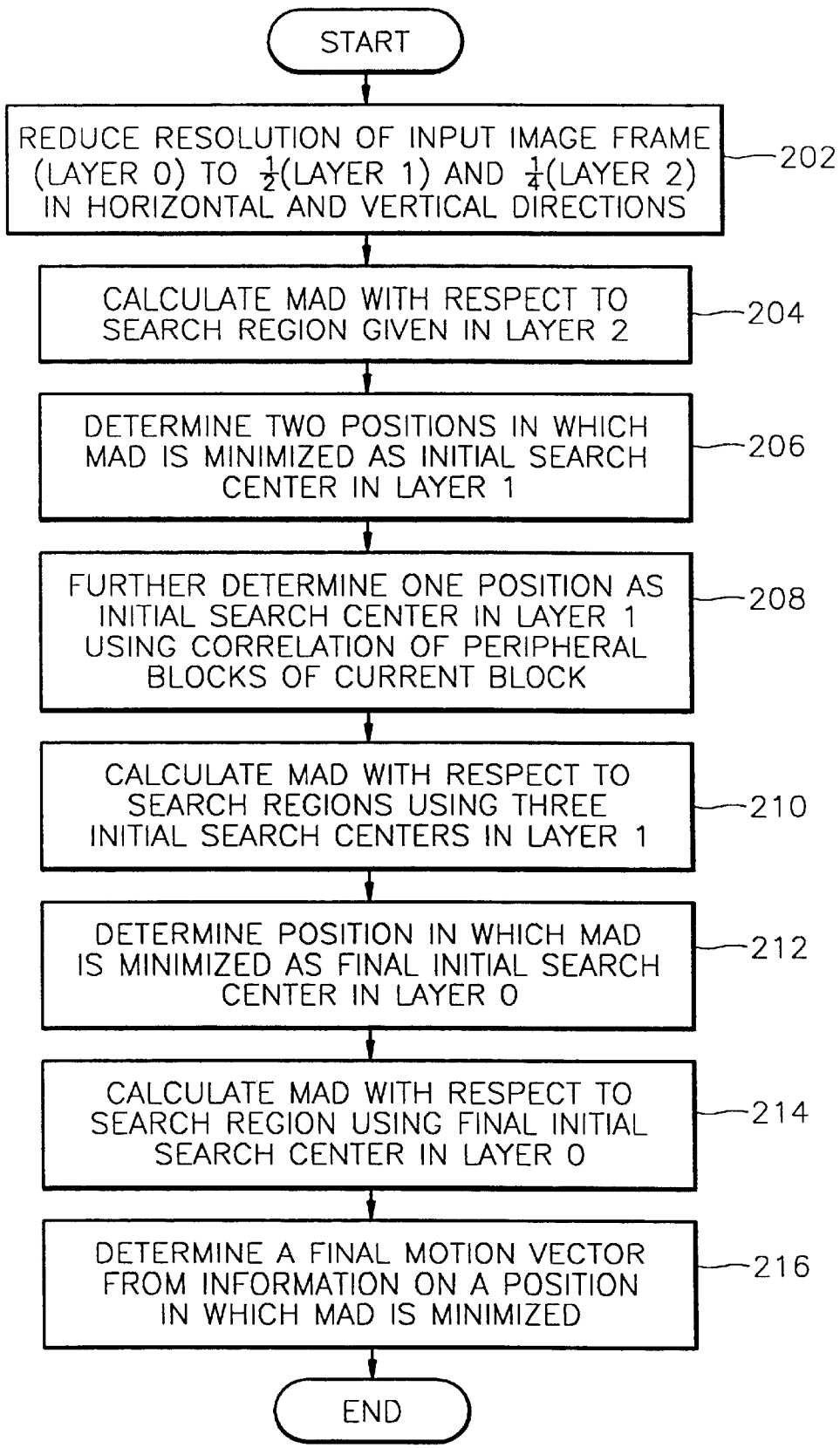
FIG. 2 is a flowchart showing the main steps of a motion estimating method according to an embodiment of the present invention.

FIG. 2 is a flowchart showing the main steps of a motion estimating method according to an illustrative embodiment of the present invention. FIG. 3 describes hierarchical searching positions when a hierarchical search is performed by the motion estimating method shown in FIG. 2.

As shown in the method in FIG. 2, the resolution of a received image frame (i.e. a layer 0 frame) is reduced by ½ in horizontal and vertical directions to produce a layer 1 frame and is reduced by ¼ in the horizontal and vertical directions to produce a layer 2 frame. (step 202). By reducing the resolution of the layer 0 frame, the size of the search region is reduced, and thus, the amount of calculations necessary to calculate the motion vector is likewise reduced. For example, when the size of the entire search region is R×R, the range of the search region becomes (R/4)×(R/4) in the present embodiment.

After the resolution of the frame has been reduced, the mean absolute difference ("MAD") is calculated with respect to the search region of the layer 2 frame $SR^{(2)}$ (FIG. 3) (step 204 ). The search region $SR^{(2)}$ is determined to be a region from −Ns to +(Ns−1) (wherein Ns is a predetermined positive integer). Thus, the region $SR^{(2)}$ becomes a region having a width of 2Ns and a length of 2Ns and includes the number zero. As a result, the number of the search positions within the region $SR^{(2)}$ is (2Ns×2Ns)/16 or (Ns×Ns)/4.

After the MAD is calculated for all of the search positions in the region $SR^{(2)}$, the two positions in which the MAD is the smallest is determined. The two positions are deemed to be the positions at which an estimated error is the smallest, and they are selected as an initial search center points for the layer 1 frames. (step 206).

Also, one additional initial search center point is selected. An example of a process for selecting the additional center point will be described with reference to FIG. 4. The compression of a digital moving image is performed in units of a block such as a macro block, and the blocks may be sequentially processed row by row.

As shown in FIG. 4, three peripheral blocks, which surround a current block being processed, become mutually related. Also, the peripheral blocks can be divided into five groups, as shown in FIGS. 4B–4F, based on the relationships of the motion vectors MVs of the blocks. For example, as shown in FIG. 4A, the motion vectors MVs of the three peripheral block are labeled $MV_1$, $MV_2$, and $MV_3$, respectively, and the relationship among the blocks can be illustrated by absolute differences among the various motion vectors $MV_1$, $MV_2$, and $MV_3$ as defined by Equation 2.

$$\xi_1 = \|MV_1 - MV_2\|,$$
$$\xi_2 = \|MV_2 - MV_3\|,$$
$$\xi_3 = \|MV_3 - MV_1\|, \quad (2)$$

In order to group the peripheral blocks into one of the five groups shown in FIGS. 4B–4F, a threshold value D is established for evaluating the similarity between the motion vectors of the peripheral blocks. Namely, if the absolute difference of the motion vectors between two of the peripheral blocks is less than the threshold value D, the motion vectors are deemed to be similar.

Figure 4A:
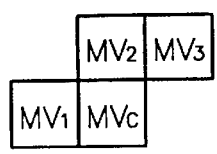
Figure 4B:
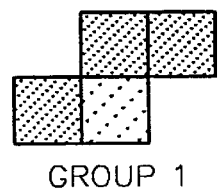
Figure 4C:
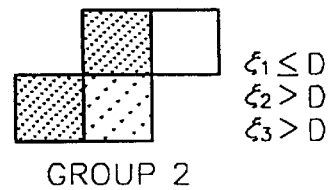
Figure 4D:
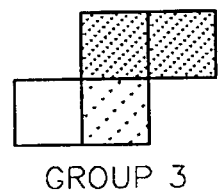
Figure 4E:
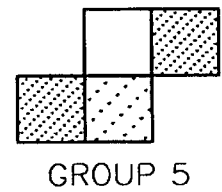
Figure 4F:
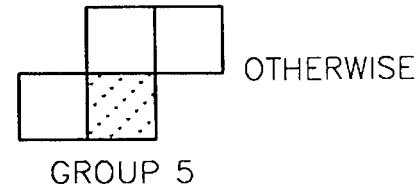

Referring to FIGS. 4B–4F, the peripheral blocks are allocated to group 1 if $\xi_1 \leq D, \xi_2 \leq D$, and $\xi_3 \leq D$. (FIG. 4B). In other words, the peripheral blocks are allocated to group 1 if the first and second peripheral blocks are similar (i.e. $\xi_1 \leq D$ the second and third peripheral blocks are similar (i.e. $\xi_2 \leq D$), and the first and third peripheral blocks are similar (i.e. $\xi_3 \leq D$). The peripheral blocks are allocated to group 2 if $\xi_1 \leq D$, $\xi_2 > D$, and $\xi_3 > D$. (FIG. 4C). In other words, the peripheral blocks are allocated to group 2 if only the first and second peripheral blocks are similar (i.e. $\xi_1 \leq D$). The peripheral blocks are allocated to group 3 if $\xi_1 > D$, $\xi_2 \leq D$, and $\xi_3 > D$. (FIG. 4D). In other words, the peripheral blocks are allocated to group 3 if only the second and third peripheral blocks are similar (i.e. $\xi_2 \leq D$). The peripheral blocks are allocated to group 4 if $\xi_1 > D$, $\xi_2 > D$, and $\xi_3 \leq D$. (FIG. 4D). In other words, the peripheral blocks are allocated to group 4 only if the first and third peripheral blocks are similar (i.e. $\xi_3 \leq D$). If none of the above conditions are satisfied, the peripheral blocks are allocated to group 5. (FIG. 4F).

The motion vector $MV_C$ for the current block is calculated as $MV_C = (MV_1 + MV_2 + MV_3)/3$ if the peripheral blocks are allocated to group 1, calculated as $MV_C = (MV_1 + MV_2)/12$ if the peripheral blocks are allocated to group 2, calculated as $MV_C = (MV_2 + MV_3)/2$ if the peripheral blocks are allocated to group 3, and is calculated as $MV_C = (MV_1 + MV_3)/2$ if the peripheral blocks are allocated to group 4. The position where the mean value of the calculated motion vectors is minimized is selected as the additional initial search center point. (step 208).

In this embodiment, one method of dividing the peripheral blocks into five groups according to the absolute subtraction of the motion vector and determining the initial search point by calculating the mean motion vector in each group is described only for the sake of explanation. Clearly, it can be modified into another method of selecting one initial search center point using the motion vector correlation of the peripheral blocks, and thus it does not restrict the scope of the present invention defined by the attached claims.

The three initial search center points identified in steps 206 and 208 are deemed to be the centers of three search regions $SR_1^{(1)}$, $SR_2^{(1)}$, and $SR_3^{(1)}$ for the layer 1 frames, and the MADs of the regions $SR_1^{(1)}$, $SR_2^{(1)}$, and $SR_3^{(1)}$ are calculated based on the three center points. (step 210). In the present embodiment, each of the search regions in the layer 1 frames is formed of ±2 pixels with respect to the corresponding search center point. In other words, each region is a block of 5×5 pixels that is centered around its respective search center point.

After the MADs of the regions are calculated, the position at which the MAD is the smallest is determined and selected as the final search center point in the layer 0 frame (step 212). The final search center point is deemed to be the center of the search region $SR^{(0)}$ of the layer 0 frame, and the region $SR^{(0)}$ contains ±2 pixels around the initial search center point. Then, the MAD of the region $SR^{(0)}$ is calculated based on the center point. (step 214).

Afterwards, the position in the region $SR^{(0)}$ in which the MAD is the smallest is determined. Then, the final motion vector is determined based on the distance between the position in which the MAD is the smallest and the origin point (step 216). In the case of a two-dimensional image, the final motion vector can be represented by x-and y-axis coordinate values.

A simulation using an MPEG-2 experimental image was performed in order to assess the performance of the motion estimating method according to the present invention. Five MPEG-2 image sequences: 'Football' (fb), 'Car' (car), 'Susie' (sus), 'Mobile and Calendar' (mob), and 'Cheerleaders' (cheer) were used as input images among the images known to those skilled in the art as experimental images. All the images had a frame rate of 30 Hz and comprised 150 frames, and the size of each frame was 720×480.

Search regions $SR^{(2)}$ of 64×64 (Ns=32) were selected for the layer 2 frames, search regions $SR^{(1)}$ of 10×10 were selected for the layer 1 frames, and search regions $SR^{(0)}$ of 5×5 were selected for the layer 0 frames. Also, the search regions $SR^{(2)}$, $SR^{(1)}$, and $SR^{(0)}$ had search point distances of 4, 2, and 1, respectively. Also, the size $N_B$ of the block was set at 16 in the layer 0, and the threshold value D for determining the similarity between the peripheral blocks was set to 8. By setting the value to 8, it was considered that the similarity between peripheral blocks is lowered when it deviates from 8 pixels, and this value D corresponds to twice the value of the search point distance for the layer 2 frames.

In order to prove the effect of the motion estimating method according to the present invention, the performance of the FSBMA is used as a comparison. Three motion vectors having only the minimum estimated difference are determined to be candidates in the layer 2 frames of the general hierarchical searching method in which a plurality of candidates are used. Meanwhile, a third candidate is estimated among the motion vectors of the neighborhood blocks in the FSBMA. Table 1 illustrates the comparison of the motion estimation and compensation of the FSBMA and the present embodiment with respect to the first 150 frames of the MPEG-2 experimental image.

TABLE 1

| Classification | Number of candidates | Average peak signal to noise ratio (PSNR) (dB) | | | | | Complexity (%) |
|---|---|---|---|---|---|---|---|
| | | Fb | Car | sus | Mob | cheer | |
| FSBMA | N/A | 25.4 | 28.0 | 36.8 | 24.7 | 23.2 | 100.0 |
| Method according to the present invention | 3 | 25.2 | 27.8 | 36.6 | 24.5 | 23.0 | 1.5 |

As shown in Table 1, the performance of the motion estimating method of the present embodiment is slightly reduced by about 0.2dB as compared with the FSBMA. However, the complexity of the method of the present embodiment is only 1.5% of the complexity of the FSBMA. If the number of operations and the number of blocks required to calculate the MAD per pixel are N and $N_B$ respectively, the complexity can be estimated by $$C = MN_B^2\left(\frac{1}{64}N_S^2 + \frac{3}{4}25 + 25\right).$$

In such equation, the values $$\frac{1}{64}N_S^2, \frac{3}{4}25,$$

and 25 represent the proportional values of the calculation amounts based on the resolutions of the layer 2, layer 1, and layer 0 frames, respectively. Therefore, when $N_S$ equals 32 and 64, the complexities of the motion estimating method according to the present embodiment are 1.5% and 0.7% of the complexity of the FSBMA, respectively.

Also, Table 2 shows the results of an experiment in which the motion estimating method of the present embodiment was applied to an MPEG-2 encoder that required a relatively wide search region. In the experiment, the number N of groups of pictures (GOP), a distance between P frames, and an objective bit rate T were respectively set as 12, 2, and 6 Mbps. Table 2 shows the PSNRs of reproduced images processed based on the FSBMA and processed based on the method of the present embodiment.

TABLE 2

| Classification | Average PSNR (dB) | | | | | Complexity (%) |
|---|---|---|---|---|---|---|
| | fb | car | sus | mob | cheer | |
| MPEG-2 encoder to which FSBMA is applied | 34.3 | 38.6 | 42.6 | 30.0 | 32.0 | 100.0 |
| MPEG-2 encoder to which the method according to the present invention is applied | 34.3 | 38.4 | 42.6 | 29.9 | 32.0 | 0.9 |

As shown in Table 2, the complexity of the motion estimating method according to the present embodiment is remarkably reduced to 0.9% of the complexity of the FSBMA. Also, the PSNR corresponding to the present embodiment is almost equal to that of the FSBMA.

As described above, the complexity of the calculations in the motion estimating method of the present invention is extremely low. Also, high speed motion can be accurately estimated since the plurality of motion vector candidates and the correlation of the motion vector space, which are based on the minimum estimated difference between frames, are effectively used.

Also, the super high-speed motion estimating method for real time moving image coding can be realized as an apparatus. The motion estimating apparatus (not shown) includes a resolution controller, an MAD calculator, an initial search point center determiner, and a final motion vector determiner.

The resolution controller generates the layer 1 frames by reducing the resolution of the layer 0 frames and generates the layer 2 frames by reducing the resolution of the layer 1 frames. An image frame can be realized by using the mean of two adjacent pixels when the resolution is reduced to ½ and can be realized by using the mean of four adjacent pixels when the resolution is reduced to ¼.

The MAD calculator calculates a first MAD with respect to the search region $SR^{(2)}$ of the layer 2 frames. The initial search center point determiner identifies at least two positions in which the first MAD is minimized as layer 1 search center points for the layer 1 frames and may determine an additional layer 1 search center point based on relationships among peripheral and current blocks in the region $SR^{(2)}$. Afterwards, the determiner determines search regions $SR^{(1)}$ of the layer 1 frames based on such search points. Then, the MAD calculator calculated a second MAD for the search regions $SR^{(1)}$ using the layer 1 search center points. The initial search center point determiner further identifies at least one position in which the second MAD is minimized as a layer 0 search center point in the search regions $SR^{(1)}$ and determines at least one search region $SR^{(0)}$ of the layer 0 frames. Afterwards, the MAD calculator calculates a third MAD with respect to the search region $SR^{(0)}$ based on the layer 0 search center point.

The final motion vector determiner determines the final motion vector based on the distance between the position in which the third MAD is minimized and the origin.

Also, the respective steps of the motion estimating method can be written as a program which can be executed in a computer and can be realized in a general digital computer for operating the program from a medium used in the computer. The medium may be a magnetic recording medium such as a floppy disk or a hard disk, an optical recording medium such as a CD-ROM or a DVD, or a carrier wave such as a transmission through the Internet. Also, the functional program, the code, and the code segments can be easily inferred by any programmer in the technical field to which the present invention belongs.

What is claimed is:

1. A motion estimating method using block matching in order to compress a moving image, comprising the steps of:

(a) inputting an input image frame as a layer 0 frame;

(b) reducing a resolution of said layer 0 frame to produce a layer 1 frame;

(c) reducing a resolution of said layer 1 frame to produce a layer 2 frame;

(d) calculating a first mean absolute difference ("MAD") with respect to a layer 2 search region of said layer 2 frame;

(e) evaluating said layer 2 search region to identify a first initial search center point based on said first MAD and determining a first layer 1 search region based on said first initial search center point;

(f) evaluating said layer 2 search region to identify a second initial search center point based on said first MAD and determining a second layer 1 search region based on said second initial search center point; and (g) evaluating said layer 2 search region to identify a third initial search center point based on a correlation of a current block and peripheral blocks of said current block and determining a third layer 1 search region based on said third initial search center point (h) calculating a second MAD with respect to said first layer 1 search region in said layer 1 frame by using said first initial search center point as a center in said first layer 1 search region;

(i) evaluating said first layer 1 search region to identify a first layer 0 search center point based on said second MAD and determining a first layer 0 search region based on said first layer 0 search center point;

(j) calculating a third MAD with respect to said first layer 0 search region in said layer 0 frame by using said first layer 0 search center point as a center in said first layer 0 search region; and (k) determining a final position in said first layer 0 search region based on said third MAD and determining a final motion vector based on information corresponding to a distance between said final position and an origin.

2. The method as claimed in claim 1, wherein said step (h) further comprises the step of:

(h1) calculating said second MAD with respect to said second layer 1 search region in said layer 1 frame by using said second initial search center point as a center in said second layer 1 search region.

3. The method as claimed in claim 2, wherein said step (i) further comprises the step of:

(i1) evaluating at least said first and second layer 1 search regions to identify said first layer 0 search center point based on said second MAD and determining said first layer 0 search region based on said first layer 0 search center point.

4. The method as claimed in claim 1, wherein said step (h) further comprises the steps of:

(h1) calculating said second MAD with respect to said second layer 1 search region in said layer 1 frame by using said second initial search center point as a center in said second layer 1 search region; and (h2) calculating said second MAD with respect to said third layer 1 search region in said layer 1 frame by using said third initial search center point as a center in said third layer 1 search region.

5. The method as claimed in claim 4, wherein said step (i) further comprises the step of:

(i1) evaluating at least said first, second, and third layer 1 search regions to identify said first layer 0 search center point based on said second MAD and determining said first layer 0 search region based on said first layer 0 search center point.

6. The method as claimed in claim 1, wherein said first initial search center point is identified in said step (e) as a position where said first MAD is minimized, and wherein said first layer 0 search center point is identified in said step (i) as a position where said second MAD is minimized.

7. The method as claimed in claim 6, wherein said final position in said first layer 0 search region is determined in said step (k) based on a position where said third MAD is minimized.

8. The method as claimed in claim 3, wherein said first and second initial search center points are identified in said steps (e) and (f) as positions where said first MAD is minimized, and wherein said first layer 0 search center point is identified in said step (i1) as a position where said second MAD is minimized.

9. The method as claimed in claim 8, wherein said final position in said first layer 0 search region is determined in said step (k) based on a position where said third MAD is minimized.

10. The method as claimed in claim 5, wherein said first, second, and third initial search center points are identified in said steps (e), (f), and (g) as positions where said first MAD is minimized, and wherein said first layer 0 search center point is identified in said step (i1) as a position where said second MAD is minimized.

11. The method as claimed in claim 10, wherein said final position in said first layer 0 search region is determined in said step (k) based on a position where said third MAD is minimized.

12. The method as claimed in claim 1, wherein said step (b) reduces said resolution of said layer 0 frame by ½ in horizontal and vertical directions to produce said layer 1 frame.

13. The method as claimed in claim 12, wherein said step (c) reduces said resolution of said layer 1 frame by ½ in horizontal and vertical directions to produce said layer 2 frame.

14. The method as claimed in claim 12, wherein said step (c) reduces said resolution of said layer 0 frame by ¼ in horizontal and vertical directions to produce said layer 2 frame.

15. The method as claimed in claim 6, wherein said first MAD is minimized to identify said first initial search center point in said step (e) by calculating mean values of motion vectors of blocks in said layer 2 search region and identifying mean values that have an absolute subtraction of said motion vectors between peripheral blocks of no more than a predetermined threshold value.

16. The method as claimed in claim 8, wherein said first MAD is minimized to identify said first and second initial search center points in said steps (e) and (f) by calculating mean values of motion vectors of blocks in said layer 2 search region and identifying mean values that have an absolute subtraction of said motion vectors between peripheral blocks of no more than a predetermined threshold value.

17. The method as claimed in claim 10, wherein said first MAD is minimized to identify said first, second, and third initial search center points in said steps (e), (f), and (g) by calculating mean values of motion vectors of blocks in said layer 2 search region and identifying mean values that have an absolute subtraction of said motion vectors between peripheral blocks of no more than a predetermined threshold value.

18. The method as claimed in claim 1, wherein said first layer 1 search region and said first layer 0 search region are regions of 5×5 pixels.

19. A computer readable medium containing a software program for performing a motion estimating routine using block matching in order to compress a moving image, wherein the software program performs the steps of:

(a) inputting an input image frame as a layer 0 frame;

(b) reducing a resolution of said layer 0 frame to produce a layer 1 frame;

(c) reducing a resolution of said layer 1 frame to produce a layer 2 frame;

(d) calculating a first mean absolute difference ("MAD") with respect to a layer 2 search region of said layer 2 frame;

(e) evaluating said layer 2 search region to identify a first initial search center point based on said first MAD and determining a first layer 1 search region based on said first initial search center point;

(f) calculating a second MAD with respect to said first layer 1 search region in said layer 1 frame by using said first initial search center point as a center in said first layer 1 search region;

(g) evaluating said first layer 1 search region to identify a first layer 0 search center point based on said second MAD and determining a first layer 0 search region based on said first layer 0 search center point;

(h) calculating a third MAD with respect to said first layer 0 search region in said layer 0 frame by using said first layer 0 search center point as a center in said first layer 0 search region; and (i) determining a final position in said first layer 0 search region based on said third MAD and determining a final motion vector based on information corresponding to a distance between said final position and an origin.

20. The computer readable medium as claimed in claim 19:
   wherein said step (e) further comprises the step of:
   (e1) evaluating said layer 2 search region to identify a second initial search center point based on said first MAD and determining a second layer 1 search region based on said second initial search center point; and
   wherein said step (f) further comprises the step of:
   (f1) calculating said second MAD with respect to said second layer 1 search region in said layer 1 frame by using said second initial search center point as a center in said second layer 1 search region.

21. The computer readable medium as claimed in claim 20, wherein said step (g) further comprises the step of:
   (g1) evaluating at least said first and second layer 1 search regions to identify said first layer 0 search center point based on said second MAD and determining said first layer 0 search region based on said first layer 0 search center point.

22. The computer readable medium as claimed in claim 19, wherein said step (e) further comprises the steps of:
   (e1) evaluating said layer 2 search region to identify a second initial search center point based on said first MAD and determining a second layer 1 search region based on said second initial search center point; and
   (e2) evaluating said layer 2 search region to identify a third initial search center point based on a correlation of a current block and peripheral blocks of said current block and determining a third layer 1 search region based on said third initial search center point.

23. The computer readable medium as claimed in claim 22, wherein said step (f) further comprises the steps of
   (f1) calculating said second MAD with respect to said second layer 1 search region in said layer 1 frame by using said second initial search center point as a center in said second layer 1 search region; and
   (f2) calculating said second MAD with respect to said third layer 1 search region in said layer 1 frame by using said third initial search center point as a center in said third layer 1 search region.

24. The computer readable medium as claimed in claim 23, wherein said step (g) further comprises the step of:
   (g1) evaluating at least said first, second, and third layer 1 search regions to identify said first layer 0 search center point based on said second MAD and determining said first layer 0 search region based on said first layer 0 search center point.

25. The computer readable medium as claimed in claim 19, wherein said first initial search center point is identified in said step (e) as a position where said first MAD is minimized, and
   wherein said first layer 0 search center point is identified in said step (g) as a position where said second MAD is minimized.

26. The computer readable medium as claimed in claim 25, wherein said final position in said first layer 0 search region is determined in said step (i) based on a position where said third MAD is minimized.

27. The computer readable medium as claimed in claim 21, wherein said first and second initial search center points are identified in said steps (e) and (e1) as positions where said first MAD is minimized, and
   wherein said first layer 0 search center point is identified in said step (g1) as a position where said second MAD is minimized.

28. The computer readable medium as claimed in claim 27, wherein said final position in said first layer 0 search region is determined in said step (i) based on a position where said third MAD is minimized.

29. The computer readable medium as claimed in claim 24, wherein said first, second, and third initial search center points are identified in said steps (e), (e1), and (e2) as positions where said first MAD is minimized, and
   wherein said first layer 0 search center point is identified in said step (g1) as a position where said second MAD is minimized.

30. The computer readable medium as claimed in claim 29, wherein said final position in said first layer 0 search region is determined in said step (i) based on a position where said third MAD is minimized.

31. The computer readable medium as claimed in claim 19, wherein said step (b) reduces said resolution of said layer 0 frame by ½ in horizontal and vertical directions to produce said layer 1 frame.

32. The computer readable medium as claimed in claim 31, wherein said step (c) reduces said resolution of said layer 1 frame by ½ in horizontal and vertical directions to produce said layer 2 frame.

33. The computer readable medium as claimed in claim 31, wherein said step (c) reduces said resolution of said layer 0 frame by ¼ in horizontal and vertical directions to produce said layer 2 frame.

34. The computer readable medium as claimed in claim 25, wherein said first MAD is minimized to identify said first initial search center point in said step (e) by calculating mean values of motion vectors of blocks in said layer 2 search region and identifying mean values that have an absolute subtraction of said motion vectors between peripheral blocks of no more than a predetermined threshold value.

35. The computer readable medium as claimed in claim 27, wherein said first MAD is minimized to identify said first and second initial search center points in said steps (e) and (e1) by calculating mean values of motion vectors of blocks in said layer 2 search region and identifying mean values that have an absolute subtraction of said motion vectors between peripheral blocks of no more than a predetermined threshold value.

36. The computer readable medium as claimed in claim 29, wherein said first MAD is minimized to identify said first, second, and third initial search center points in said steps (e), (e1), and (e2) by calculating mean values of motion vectors of blocks in said layer 2 search region and identifying mean values that have an absolute subtraction of said motion vectors between peripheral blocks of no more than a predetermined threshold value.

37. The computer readable medium as claimed in claim 19, wherein said first layer 1 search region and said first layer 0 search region are regions of 5×5 pixels.

38. A motion estimating apparatus using block matching in order to compress a moving image, comprising:
   a resolution controller that inputs an input image frame as a layer 0 frame, reduces the resolution of said layer 0 frame to produce a layer 1 frame, and reduces the resolution of said layer 1 frame to produce a layer 2 frame;
   a mean absolute difference ("MAD") calculator that calculates a first MAD with respect to a layer 2 search region of said layer 2 frame;
   an initial search center point determiner that evaluates said layer 2 search region to determine a first initial search center point based on said first MAD and that determines a first layer 1 search region based on said first initial search center point, wherein said MAD calculator calculates a second MAD with respect to said first layer 1 search region in said layer 1 frame by using said first initial search center point as a center in said first layer 1 search region, wherein said initial search center point determiner evaluates said first layer 1 search region to determine a first layer 0 search center point based on said second MAD and determines a first layer 0 search region based on said first layer 0 search center point, wherein said MAD calculator calculates a third MAD with respect to said first layer 0 search region in said layer 0 frame by using said first layer 0 search center point as a center in said first layer 0 search region; and a final motion vector determiner that determines a final position in said first layer 0 search region based on said third MAD and determines a final motion vector based on information corresponding to a distance between said final position and an origin.

39. The apparatus as claimed in claim 38, wherein said initial search center point determiner evaluates said layer 2 search region to identify a second initial search center point based on said first MAD and determines a second layer 1 search region based on said second initial search center point, and wherein said MAD calculator calculates said second MAD with respect to said second layer 1 search region in said layer 1 frame by using said second initial search center point as a center in said second layer 1 search region.

40. The apparatus as claimed in claim 39, wherein said initial search center point determiner evaluates at least said first and second layer 1 search regions to identify said first layer 0 search center point based on said second MAD and determines said first layer 0 search region based on said first layer 0 search center point.

41. The apparatus as claimed in claim 38, wherein said initial search center point determiner evaluates said layer 2 search region to identify a second initial search center point based on said first MAD and determines a second layer 1 search region based on said second initial search center point, and wherein said initial search center point determiner evaluates said layer 2 search region to identify a third initial search center point based on a correlation of a current block and peripheral blocks of said current block and determines a third layer 1 search region based on said third initial search center point.

42. The apparatus as claimed in claim 41, wherein said MAD calculator calculates said second MAD with respect to said second layer 1 search region in said layer 1 frame by using said second initial search center point as a center in said second layer 1 search region, and wherein said MAD calculator calculates said second MAD with respect to said third layer 1 search region in said layer 1 frame by using said third initial search center point as a center in said third layer 1 search region.

43. The apparatus as claimed in claim 42, wherein said initial search center point determiner evaluates at least said first, second, and third layer 1 search regions to identify said first layer 0 search center point based on said second MAD and determines said first layer 0 search region based on said first layer 0 search center point.

44. The apparatus as claimed in claim 38, wherein said first initial search center point is identified as a position where said first MAD is minimized, and wherein said first layer 0 search center point is identified as a position where said second MAD is minimized.

45. The apparatus as claimed in claim 44, wherein said final position in said first layer 0 search region is determined based on a position where said third MAD is minimized.

46. The apparatus as claimed in claim 40, wherein said first and second initial search center points are identified as positions where said first MAD is minimized, and wherein said first layer 0 search center point is identified as a position where said second MAD is minimized.

47. The apparatus as claimed in claim 46, wherein said final position in said first layer 0 search region is determined based on a position where said third MAD is minimized.

48. The apparatus as claimed in claim 43, wherein said first, second, and third initial search center points are identified as positions where said first MAD is minimized, and wherein said first layer 0 search center point is identified as a position where said second MAD is minimized.

49. The apparatus as claimed in claim 48, wherein said final position in said first layer 0 search region is determined based on a position where said third MAD is minimized.

50. The apparatus as claimed in claim 38, wherein resolution controller reduces said resolution of said layer 0 frame by ½ in horizontal and vertical directions to produce said layer 1 frame.

51. The apparatus as claimed in claim 50, wherein resolution controller reduces said resolution of said layer 1 frame by ½ in horizontal and vertical directions to produce said layer 2 frame.

52. The apparatus as claimed in claim 50, wherein resolution controller reduces said resolution of said layer 0 frame by ¼ in horizontal and vertical directions to produce said layer 2 frame.

53. The apparatus as claimed in claim 44, wherein said first MAD is minimized to identify said first initial search center point by calculating mean values of motion vectors of blocks in said layer 2 search region and identifying mean values that have an absolute subtraction of said motion vectors between peripheral blocks of no more than a predetermined threshold value.

54. The apparatus as claimed in claim 46, wherein said first MAD is minimized to identify said first and second initial search center points by calculating mean values of motion vectors of blocks in said layer 2 search region and identifying mean values that have an absolute subtraction of said motion vectors between peripheral blocks of no more than a predetermined threshold value.

55. The apparatus as claimed in claim 48, wherein said first MAD is minimized to identify said first, second, and third initial search center points by calculating mean values of motion vectors of blocks in said layer 2 search region and identifying mean values that have an absolute subtraction of said motion vectors between peripheral blocks of no more than a predetermined threshold value.

56. The computer readable medium as claimed in claim 38, wherein said first layer 1 search region and said first layer 0 search region are regions of 5×5 pixels.

* * * * *